(12) United States Patent
Ando

(10) Patent No.: US 7,775,433 B2
(45) Date of Patent: Aug. 17, 2010

(54) OPTICAL DEFLECTION APPARATUS, IMAGE FORMING APPARATUS, AND METHOD OF DRIVING OPTICAL DEFLECTION APPARATUS

(75) Inventor: Hirotake Ando, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/048,675

(22) Filed: Mar. 14, 2008

(65) Prior Publication Data

US 2008/0239445 A1 Oct. 2, 2008

(30) Foreign Application Priority Data

Apr. 2, 2007 (JP) ............................. 2007-096323

(51) Int. Cl.
*G06K 7/10* (2006.01)
*G06K 7/14* (2006.01)
*G02B 26/00* (2006.01)

(52) U.S. Cl. ............. 235/454; 235/462.36; 235/462.38; 235/472.01; 235/472.02; 235/472.03; 359/290; 359/291; 359/292; 359/237; 310/309; 310/310

(58) Field of Classification Search .................. 235/454, 235/462.35, 462.36, 462.43; 359/198, 213, 359/214, 220, 226, 237, 221, 290–292; 310/309, 310/310

See application file for complete search history.

(56) References Cited

U.S. PATENT DOCUMENTS

| 4,859,846 | A | 8/1989 | Burrer |
| 5,969,465 | A * | 10/1999 | Neukermans et al. ........ 310/333 |
| 6,297,898 | B1 * | 10/2001 | Tanijiri et al. ............ 359/224.1 |
| 6,819,103 | B2 * | 11/2004 | Champion et al. .......... 324/260 |
| 7,248,390 | B2 * | 7/2007 | Harris ..................... 359/213.1 |
| 7,271,943 | B2 | 9/2007 | Yasuda et al. |
| 2003/0063367 | A1 * | 4/2003 | Widzgowski ............... 359/287 |
| 2006/0152785 | A1 | 7/2006 | Yasuda et al. |

FOREIGN PATENT DOCUMENTS

| JP | 9-197334 | 7/1997 |
| JP | 2005-208578 | 8/2005 |
| JP | 2005-292627 | 10/2005 |
| WO | WO 2005/063613 | 7/2005 |

* cited by examiner

*Primary Examiner*—Thien Minh Le
*Assistant Examiner*—Tuyen K Vo
(74) *Attorney, Agent, or Firm*—Fitzpatrick, Cella, Harper & Scinto

(57) ABSTRACT

An optical deflection apparatus including a light source; an optical deflector including first and second oscillators and first and second torsion springs, the first torsion spring connecting the first and second oscillators, the second torsion spring being connected to the second oscillator, and the first and second torsion springs sharing a common torsion axis; and a driver that applies a driving force to the optical deflector; and a driving controller that supplies a driving signal to the driver. The driving controller sets a reference frequency on the basis of a resonant frequency of the optical deflector, calculates a target time at which one of the first and second oscillators makes a predetermined deflection angle on the basis of the reference frequency, and supplies such a driving signal that the one of the first and second oscillators passes through a point corresponding to the predetermined deflection angle at the target time.

12 Claims, 7 Drawing Sheets

OPTICAL DEFLECTION APPARATUS, IMAGE FORMING APPARATUS, AND METHOD OF DRIVING OPTICAL DEFLECTION APPARATUS

BACKGROUND OF THE INVENTION

1. Field of the Invention

The present invention relates to an optical deflection apparatus including a microstructure, a method of driving an optical deflection apparatus, and an image forming apparatus including an optical deflection apparatus, such as a laser beam printer.

2. Description of the Related Art

Recently, optical deflection apparatuses that perform scanning with light beams are used in image forming apparatuses such as optical disc readers, barcode readers, laser beam printers, and digital copying machines.

As a type of such optical deflection apparatuses, resonant optical deflection apparatuses have been proposed, in which typically micromirrors formed by silicon micromachining techniques are driven by resonance.

A resonant optical deflection apparatus can be constructed in a much smaller size when compared with an optical deflection apparatus in which a rotary multiple-face mirror such as a polygon mirror is used. Furthermore, the resonant optical deflection apparatus is advantageous in that power consumption is small, face tangle does not occur theoretically, and in the case of an optical deflection apparatus formed of Si monocrystal, manufactured by semiconductor processes, metal fatigue does not occur theoretically so that durability is excellent.

According to techniques described in U.S. Pat. No. 4,859,846, driving based on a triangular wave is achieved by using an optical deflector having a vibration mode at a fundamental frequency and a vibration mode at a frequency that is triple the fundamental frequency. FIG. 7 shows a micromirror that is driven according to a triangular wave. An optical deflection apparatus 12 includes oscillators 14 and 16, torsion springs 18 and 20, drivers 23 and 50, detectors 15 and 32, and a control circuit 30. This micromirror has a fundamental resonant frequency and a resonant frequency that is substantially triple the fundamental resonant frequency, and is driven according to a combined frequency of the fundamental resonant frequency and the substantially triple resonant frequency. Thus, the oscillator 14 having a mirror surface is driven according to a triangular wave, so that the deflection angle has less change in the angular velocity compared with a case of driving according to a sine wave. At this time, vibration of the oscillator 14 is detected by the detectors 15 and 32, the control circuit 30 generates a driving signal needed to generate a triangular wave, and drivers 23 and 50 drive the micromirror.

Furthermore, International Publication No. WO2005/063613 discloses a micro oscillator in which a system including a plurality of torsion springs and a plurality of movable members have a plurality of separate natural vibration modes. In the micro oscillator, the plurality of separate natural vibration modes includes a reference vibration mode, which is a natural vibration mode at a reference frequency, and an even-multiple vibration mode, which is a natural vibration mode at a frequency that is substantially an even-integer multiple of the reference frequency. According to International Publication No. WO2005/063613, for example, driving according to a sawtooth wave is achieved by causing the micro oscillator to vibrate in these oscillation modes.

Furthermore, according to Japanese Patent Laid-Open No. 2005-292627, in order to detect a scanning position of a light beam deflected by a deflection mirror driven according to a sine wave, a time at which the deflected scanning light beam passes through a predetermined point is detected by an optical sensor, and the deflection mirror is controlled on the basis of the detected time.

The resonant frequency of a resonant optical deflector is determined according to the mass of an oscillator and the spring constant of a torsion spring in the optical deflector. Since the spring constant of the torsion spring changes depending on environmental factors such as temperature, the resonant frequency of the resonant optical deflector also changes depending on environmental factors.

In order to correct such a variation in the resonant frequency of the optical deflector, for example, according to techniques described in Japanese Patent Laid-Open No. 9-197334, a heat generator is provided in an optical deflector to heat a torsion spring and thereby adjust the resonant frequency.

Although it is possible to drive an oscillator in an optical deflection apparatus according to a triangular wave or a sawtooth wave according to the documents described above, further improvement is desired regarding control of the deflection angle of the oscillator.

Particularly, control of the deflection angle is an important issue in a case where the resonant frequency of an optical deflector changes due to environmental factors.

SUMMARY OF THE INVENTION

According to the present invention, an optical deflection apparatus can be precisely controlled even if the resonant frequency of an optical deflector changes.

An optical deflection apparatus according to an aspect of the present invention includes a light source configured to generate a light beam; an optical deflector including a first oscillator, a second oscillator, a first torsion spring, and a second torsion spring, the first torsion spring connecting the first oscillator and the second oscillator, the second torsion spring being connected to the second oscillator, and the first and second torsion springs sharing a common torsion axis; a driver configured to apply a driving force to the optical deflector; and a driving controller configured to supply a driving signal to the driver.

The driving controller is configured to set a reference frequency of the driving signal for driving the optical deflector on the basis of a resonant frequency of the optical deflector, to calculate a target time at which one of the first and second oscillators makes a predetermined deflection angle on the basis of the reference frequency, and to supply such a driving signal that the one of the first and second oscillators passes through a point corresponding to the predetermined deflection angle at the target time.

An image forming apparatus according to another aspect of the present invention includes the optical deflection apparatus configured as described above; an optical system; and a photosensitive body. The optical deflector performs scanning using the light beam generated by the light source, and the optical system condenses scanning line at a target position on the photosensitive body.

A method of driving an optical deflection apparatus including an optical deflector having a plurality of natural vibration modes, according to another aspect of the present invention, includes the steps of measuring a resonant frequency of the optical deflector; setting a reference frequency for driving the optical deflector on the basis of the resonant frequency that has been measured; setting a target time at which deflected light deflected by the optical deflector makes a predetermined deflection angle on the basis of the reference frequency that has been set; measuring a time at which the optical deflector makes the predetermined angle; and determining a driving signal for driving the optical deflector on the basis of the target time that has been set and time information representing the time that has been measured.

According to the present invention, it is possible to control an optical deflection apparatus precisely even when the resonant frequency of an optical deflector changes.

Further features of the present invention will become apparent from the following description of exemplary embodiments with reference to the attached drawings.

DESCRIPTION OF THE EMBODIMENTS

Overall Apparatus Configuration

Figure 1:
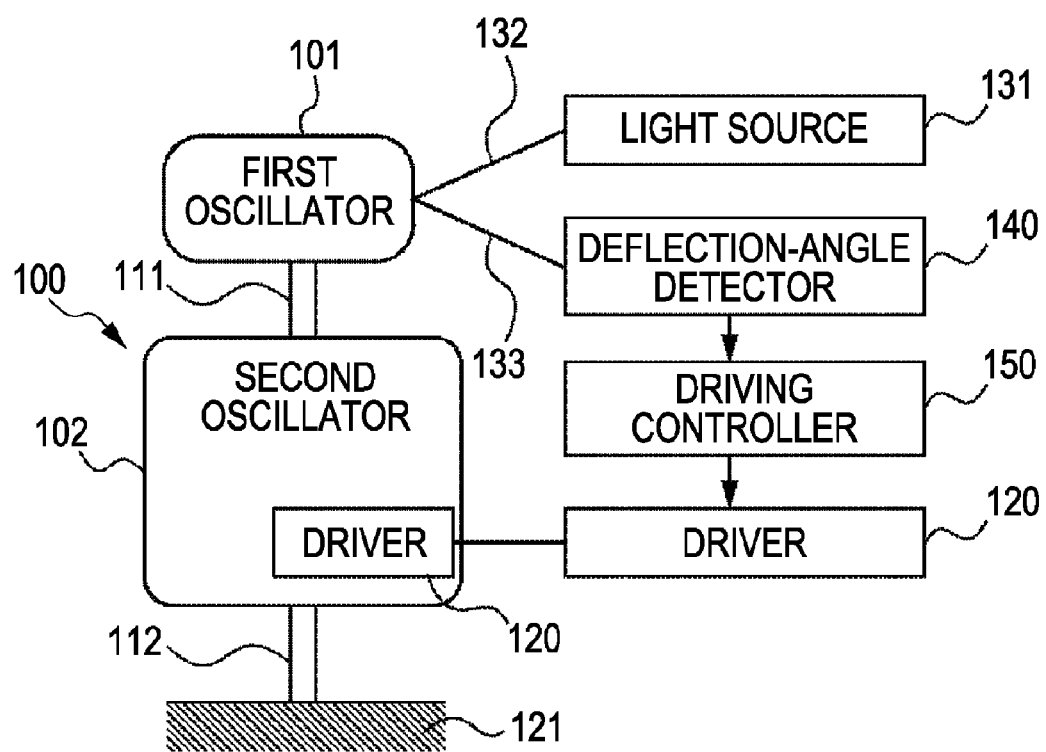
FIG. 1 is a block diagram of an optical deflection apparatus according to the present invention.

FIG. 1 is a block diagram of an optical deflection apparatus according to the present invention. An optical deflector 100 includes a first oscillator 101, a second oscillator 102, a first torsion spring 111 connecting the first oscillator 101 and the second oscillator 102, and a second torsion spring 112 connected to the second oscillator 102 and sharing a common torsion axis with the first torsion spring 111.

A driver 120 is configured so that it can apply a driving force to the optical deflector 100, such as an electromagnetic force, an electrostatic force, a piezoelectric force. In FIG. 1, one part of the driver 120 is provided in the second oscillator 102 and another part of the driver 120 is provided in the proximity thereof. These parts of the driver 120 cooperate to apply a driving force to the second oscillator 102. In a case where the optical deflector 100 is driven by an electromagnetic force, for example, the arrangement may be such that a magnet is provided in the second oscillator 102 and a coil is provided at such a distance that a driving force can be applied to the magnet. Conversely, the arrangement may be such that a coil is provided in the second oscillator 102 and a magnet is provided in the proximity thereof. Although the driver 120 is provided in association with the second oscillator 102, according to the present invention, the driver 120 may be provided in association with the first oscillator 101.

The first oscillator 101 has a reflection mirror on the surface thereof so that the first oscillator 101 deflects a light beam 132 transmitted from a light source 131.

A deflected light 133 deflected by the optical deflector 100 is received by a deflection-angle detector 140 having photodetector elements, and outputs corresponding timing information to a driving controller 150.

The driving controller 150 generates a driving signal for driving the optical deflector 100, and supplies the driving signal to the driver 120.

Furthermore, the driving controller 150 sets a reference frequency of the driving signal for driving the optical deflector 100, calculates a target time at which one of the first and second oscillators 101 and 102 make a predetermined deflection angle on the basis of the reference frequency, and supplies such a driving signal that the one of the first and second oscillators 101 and 102 passes through a point corresponding to the predetermined deflection angle.

Now, the optical deflection apparatus according to the present invention will be described in detail.

Optical Deflector

An optical deflector 100 according to the present invention includes the two oscillators 101 and 102 and the two torsion springs 111 and 112 as shown in FIG. 1.

Now, the principles of operation of an optical deflector according to this embodiment will be described. Generally, the equation of free vibration of a vibration system including n oscillators and n torsion springs can be expressed by expression (1) below:

$$M\ddot{\theta} + K\theta = 0 \qquad (1)$$

$$\theta = \begin{pmatrix} \theta_1 \\ \theta_2 \\ \vdots \\ \theta_n \end{pmatrix}, M = \begin{pmatrix} I_1 & & & \\ & I_2 & & \\ & & \ddots & \\ & & & I_n \end{pmatrix},$$

$$K = \begin{pmatrix} k_1 & -k_1 & & \\ -k_1 & k_1+k_2 & -k_2 & \\ & & \ddots & \\ & & -k_{n-1} & k_{n-1}+k_n \end{pmatrix}$$

In expression (1), $I_k$ denotes the moment of inertia of a k-th oscillator, $k_k$ denotes the spring constant of a k-th torsion spring, and $\theta_k$ denotes a torsion angle of a k-th oscillator (k=1 to n). Letting the eigenvalue of $M^{-1}K$ of this system be denoted by $\lambda_k$ (k=1 to n), the angular frequency $\omega_k$ in the eigenmode can be expressed as $\omega_k = \sqrt{(\lambda_k)}$.

In the optical deflector according to the present invention, by configuring a vibration system including two oscillators and two torsion springs and having two oscillation modes so that a fundamental frequency and a frequency corresponding to an integer multiple of the fundamental frequency are included in the angular frequencies $\omega_k$, the oscillators can be caused to perform various movements. According to the present invention, the expression "integer multiple" should be construed to cover "substantially integer multiple", i.e., a range of values of approximately 0.98 n to 1.02 n (n is an arbitrarily chosen integer) times the fundamental frequency.

Figure 4A:
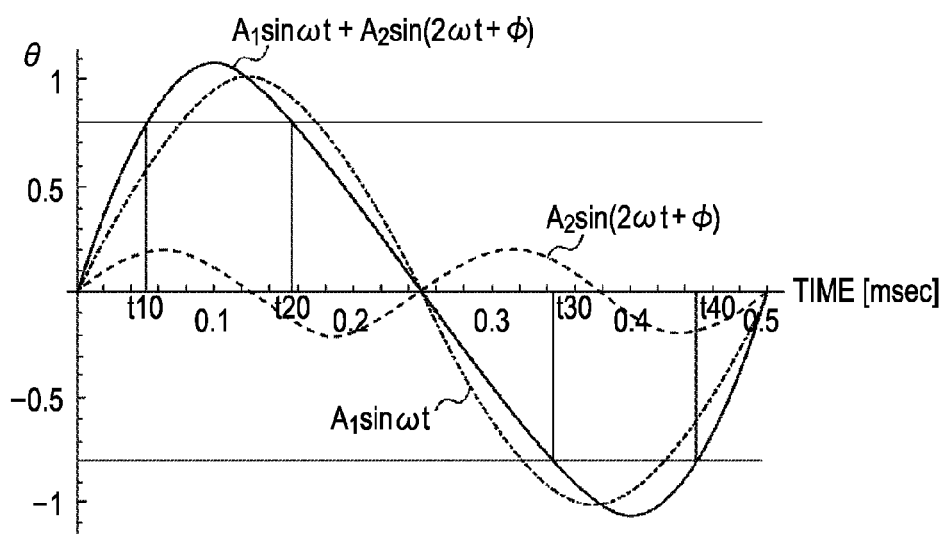
FIGS. 4A is a diagram showing relationship between the deflection angle of the optical deflection apparatus according to the present invention and temporal change.
Figure 4B:
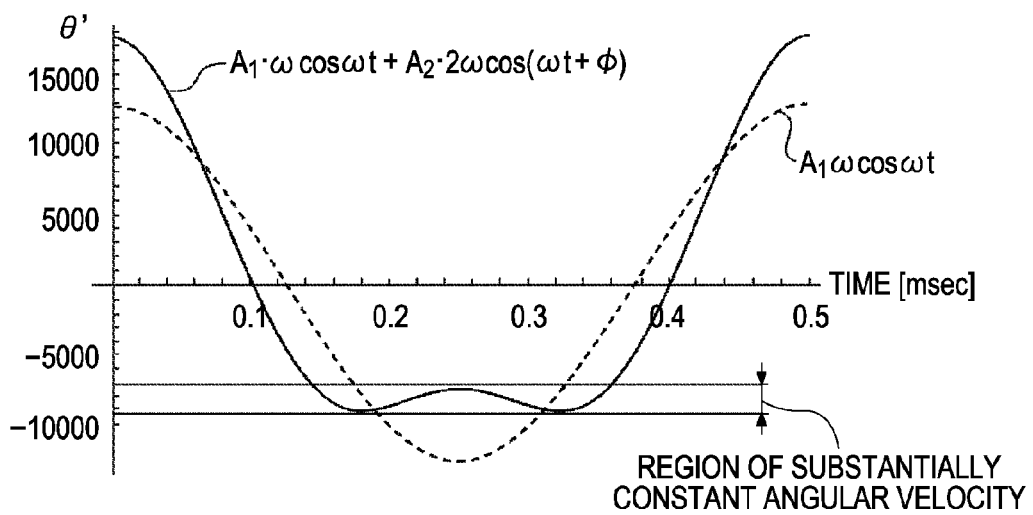
FIG. 4B is a diagram showing a region of substantially constant angular velocity of the optical deflection apparatus according to the present invention.

Particularly, by configuring the optical deflector according to this embodiment so that two oscillators and two torsion springs are provided and a fundamental frequency and a frequency that is substantially double the fundamental frequency in the angular frequencies $\omega_k$, it is possible to drive the optical deflector at a substantially constant angular velocity with little variation in the angular velocity of the oscillators in a predetermined range. More specifically, the optical deflector is driven according to a combined wave $A_1 \sin \omega t + A_2 \sin(2\omega t + \phi)$ of a sine wave $A_1 \sin \omega t$ having the fundamental frequency and a sine wave $A_2 \sin(2\omega t + \phi)$ having a frequency that is double the fundamental frequency, as shown in FIG. 4A. Then, as shown in FIG. 4B, a region of angular velocity in which the optical deflector is driven at a substantially constant angular velocity is increased compared with a case where the optical deflector is driven according to the sine wave $A_1 \sin \omega t$.

Figure 3A:
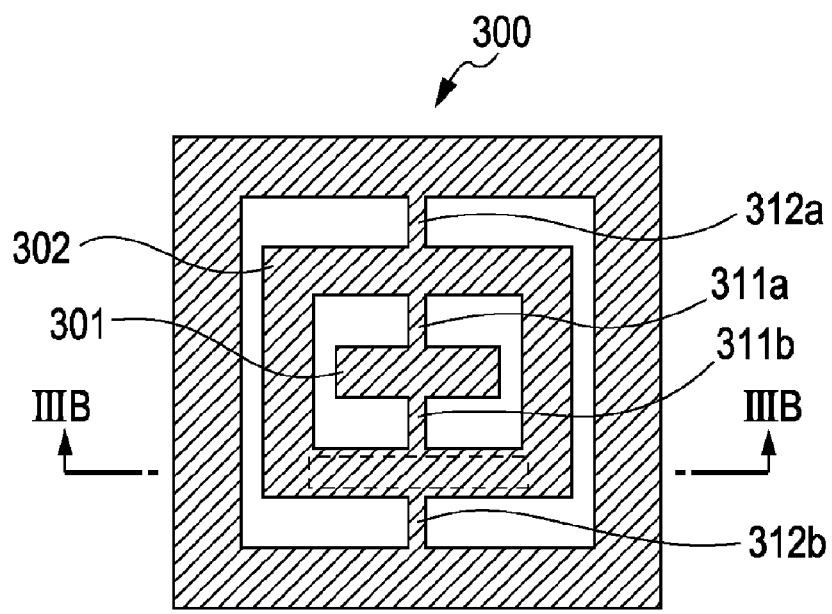
FIGS. 3A and 3B are diagrams showing an example of an optical deflector according to the present invention.
Figure 3B:
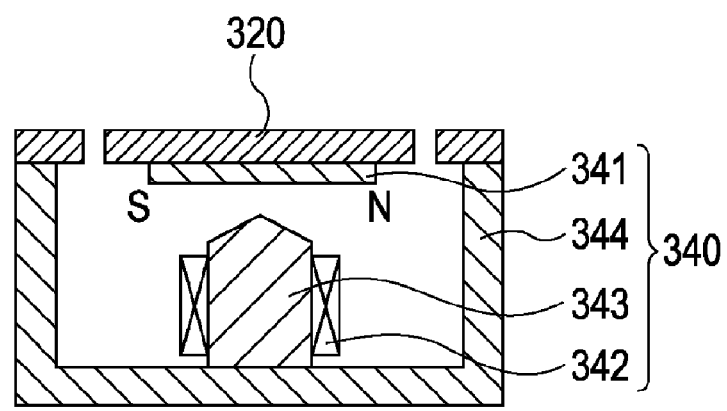

FIGS. 3A and 3B show a specific example configuration of the optical deflection apparatus according to the present invention. FIG. 3A is a top view of an optical deflector. A plate member 300 is manufactured by etching a silicon wafer. An oscillator 301 having a plate shape is supported by two torsion springs 311a and 311b at its top and bottom as viewed in FIG. 3A. On a top surface of the oscillator 301, a light reflecting film is formed. An oscillator 302 having a frame shape supports the torsion springs 311a and 311b inside thereof, and is supported by two torsion springs 312a and 312b at its top and bottom as viewed in FIG. 3A. A supporting frame supports the torsion springs 312a and 312b inside thereof. The torsion springs 311a, 311b, 312a, and 312b share the same torsion axis. The oscillators 301 and 302 and the torsion springs 311a, 311b, 312a, and 312b have two vibration modes according to the principles described earlier, and are adjusted so that the frequency in one of the modes is substantially double the frequency in the other mode.

FIG. 3B is a schematic diagram for explaining a driver of the optical deflection apparatus. Referring to FIG. 3B, the plate member 300 is shown in section taken along a line IIIB-IIIB in FIG. 3A. On a bottom surface of the oscillator 302, a permanent magnet 341 is bonded. The plate member 300 is bonded to a yoke 344 formed of a material having a high magnetic permeability. In a region of the yoke 344 facing the permanent magnet 341, a core 343 formed of a material having a high magnetic permeability is provided, and a coil 342 is wound around the core 343. The permanent magnet 341, the coil 342, the core 343, and the yoke 344 form an electromagnetic actuator 340. When a current is caused to flow through the coil 342, a torque is applied to the permanent magnet 341, whereby the oscillators 301 and 302 are driven.

Deflection-Angle Detector

A deflection-angle detector will be described with reference to FIGS. 2A to 2C. The oscillator 101 has a reflection mirror on the surface thereof so that the oscillator 101 deflects the light beam 132 transmitted from the light source 131.

Figure 2A:
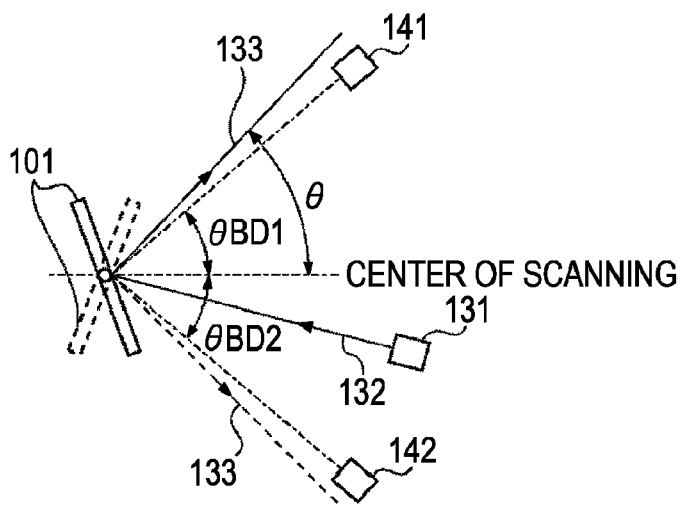
FIGS. 2A to 2C are diagrams showing an arrangement of photodetector elements in the optical deflection apparatus according to the present invention.

In the optical deflection apparatus according to the present invention, for example, first and second photodetector elements 141 and 142 may be provided at positions corresponding to first and second deflection angles, as shown in FIG. 2A.

Figure 2B:
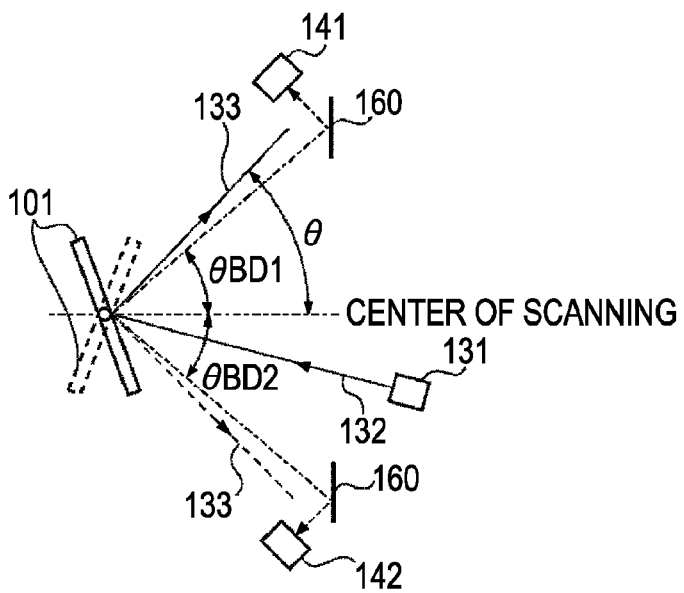

Alternatively, as shown in FIG. 2B, reflecting members 160 may be provided at positions corresponding to first and second deflecting angles so that light reflected by the individual reflecting members 160 is received by the first and second photodetector elements 141 and 142.

Figure 2C:
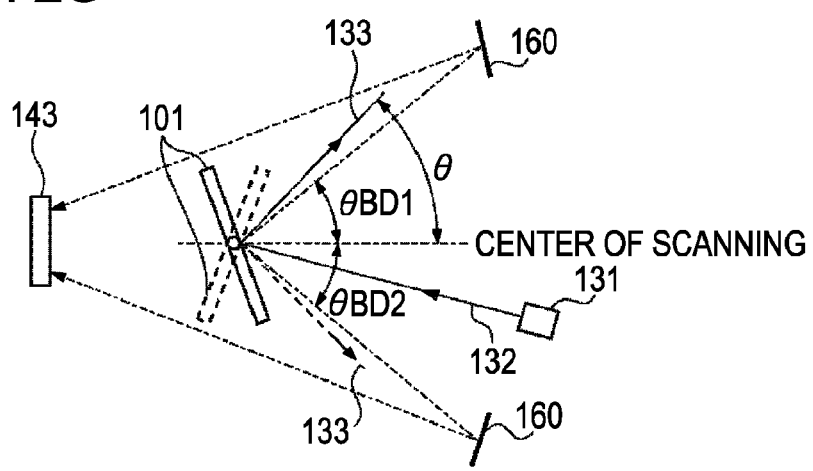

Further alternatively, as shown in FIG. 2C, reflecting members 160 may be provided at positions corresponding to first and second deflection angles so that light reflected by the individual reflecting members 160 is received by a single photodetector element 143. In this case, the photodetector element 143 is provided opposite to the light source 131 across the oscillator 101.

Although times at which scanning light passes through points corresponding to the first and second deflecting angles are measured in this embodiment, without limitation, times at which scanning light passes through positions corresponding to a larger number of deflection angles may be measured.

Furthermore, as an alternative to the arrangement for detecting the deflection angle of an oscillator described above, it is possible to use piezoelectric resistors. In a case where the deflection angle of an oscillator is detected using piezoelectric resistors, for example, piezoelectric resistors are provided at the torsion springs 111 and 112, and a time at which the oscillator makes a certain deflection angle is detected on the basis of signals output from the piezoelectric resistors. The piezoelectric resistors can be manufactured, for example, by diffusing phosphorus in p-type monocrystalline silicon. The piezoelectric resistors output signals according to torsion angles of the torsion springs 111 and 112. Thus, in order to measure the deflection angle of an oscillator, precision of measurement is improved when piezoelectric resistors are provided at a plurality of torsion angles so that the deflection angle of the oscillator is determined on the basis of information of the torsion angles of the plurality of torsion springs.

Time information representing a time at which the oscillator makes a predetermined deflection angle, detected by the arrangement described above, is output to the driving controller 150.

Driving Controller

The driving controller 150 sets a reference frequency of driving signals on the basis of the resonant frequency of the optical deflector 100. Basically, the reference frequency is the resonant frequency of the optical deflector 100. However, the reference frequency may be chosen to have a value somewhat different from the peak of the resonant frequency of the optical deflector 100 if this allows sufficiently efficient operation of the optical deflector 100.

The resonant frequency of the optical deflector 100 is determined according to the moment of inertia of the oscillators 101 and 102 and the spring constants of the torsion springs 111 and 112. Furthermore, the resonant frequency of the optical deflector 100 changes depending on factors such as temperature.

According to the present invention, it is possible to design an optical deflector on the basis of an estimated range of resonant frequency. For example, an ambient temperature vs. resonant frequency table for the optical deflector 100 is provided so that a resonant frequency can be determined with reference to the table by measuring the temperature of the optical deflector 100. For example, this table is stored in the driving controller 150 and a temperature sensor is provided in the proximity of the optical deflector so that the driving controller 150 can obtain information representing the resonant frequency.

Alternatively, the optical deflector 100 may be driven at frequencies in a range having a certain width so that the resonant frequency can be determined on the basis of relationship between driving frequencies and displacements in the operation (i.e., the frequency associated with a maximum displacement is determined as the resonant frequency).

Further alternatively, the resonant frequency may be determined on the basis of attenuation in the operation of the optical deflector 100 by deactivating the optical deflector 100 after it is driven. In this case, for example, the resonant frequency can be measured on the basis of a counter electromotive force of a driving coil.

In order to measure the resonant frequency, a resonant-frequency measurement unit (not shown) may be provided separately.

On the basis of the reference frequency that has been set, the driving controller 150 calculates a target time at which one of the oscillators makes a predetermined deflection angle.

At this time, the controller 150 sets such a target time that a large region of substantially constant angular velocity can be achieved at the driving frequency as shown in FIG. 4B.

Then, the driving controller 150 supplies such a driving signal to the driver 120 that the one of the oscillators passes through a point corresponding to the predetermined deflection angle at the target time.

The displacement of the one of the oscillators can be expressed by a mathematical expression at least including a term $A_1 \sin \omega t + A_2 \sin(n\omega t + \phi)$, where $A_1$ and $A_2$ denote amplitudes, $\phi$ denotes a relative phase difference, $\omega$ denotes the angular frequency, t denotes time, and n is an integer greater than or equal to two.

Furthermore, the driving controller 150 can determine a driving signal according to the target time calculated on the basis of the reference frequency and according to time information representing the time at which the oscillator makes the predetermined deflection angle. That is, by comparing a target time calculated on the basis of the reference frequency with the time information representing the time at which the oscillator makes the predetermined deflection angle, detected before changing the driving signal, the driving controller 150 can determine a driving signal for driving the optical deflector according to the target time.

Furthermore, on the basis of the target time calculated on the basis of the reference frequency and the time information representing the time at which the oscillator makes the predetermined deflection angle, the driving controller 150 can supply such a driving signal that A1, A2, and $\phi$ in the mathematical expression at least including the term $A_1 \sin \omega t + A_2 \sin(n \omega t + \phi)$ have predetermined values. By driving the oscillator according to the changed driving signal as described above, it is possible to drive the oscillator so as to achieve the target displacement expressed by the mathematical expression at least including the term $A_1 \sin \omega t + A_2 \sin(n\omega t + \phi)$.

Furthermore, when one of the oscillators makes first and second deflection angles, the deflection-angle detector can detect first and second times at which the one of the oscillators makes the first deflection angle, the first and second times being different from each other, and third and fourth times at which the one of the oscillators makes the second deflection angle, the third and fourth times being different from each other.

The driving controller 150 can set a reference frequency of driving signals on the basis of the resonant frequency of the optical deflector 100, and calculate target times for the first to fourth times on the basis of the reference frequency. Then, the driving controller 150 supplies such a driving signal to the driver 120 that the one of the oscillators is driven according to the target times.

Furthermore, for example, let the difference between the second time and the first time be denoted by $\Delta t_2$, the difference between the third time and the first time be denoted by $\Delta t_3$, and the difference between the fourth time and the first time be denoted by $\Delta t_4$. In this case, the driving controller 150 can set a reference frequency for driving signals on the basis of the resonant frequency of the optical deflector, and calculate target times for $\Delta t_2$, $\Delta t_3$, and $\Delta t_4$ on the basis of the reference frequency. Then, the driving controller 150 supplies such a driving signal to the driver 120 that the one of the oscillators is driven according to the target times for $\Delta t_2$, $\Delta t_3$, and $\Delta t_4$.

Driving Method

Next, a driving method of an optical deflection apparatus according to the present invention will be described with reference to FIG. 5. The optical deflection apparatus according to the present invention is configured as described above, and is driven and controlled according to the following procedure.

First, the resonant frequency of the optical deflector 100 is measured by a resonant-frequency measurement circuit 490.

Then, a reference frequency is set on the basis of the resonant frequency, and target times at which light deflected by the optical deflector 100 make predetermined deflection angles are set on the basis of the reference frequency. The target times are calculated by a controller 400, and the target times 410, 411, and 412 are set in registers.

A time-measurement unit 420 measures times at which the optical deflector 100 being driven makes the predetermined deflection angles on the basis of outputs of the first and second photodetector elements 141 and 142. Time information representing the measured times are stored as detected times 421, 422, and 423.

Then, a driving signal for driving the optical deflector 100 is determined on the basis of the target times 410, 411, and 412 and the time information representing the times at which the optical deflector 100 makes the predetermined deflection angles (detected times 421, 422, and 423).

For example, the driving signal can be determined on the basis of the differences between the target times 410, 411, and 412 and the detected times 421, 422, and 423.

The driving signal determined in this manner is supplied to the driver 120 so that the optical deflection apparatus is driven according to the driving signal.

EXAMPLES

First Example

An optical deflection apparatus according to a first example of the present invention will be described. The optical deflection apparatus according to the first example is configured the same as shown in the block diagram of FIG. 1. In the optical deflection apparatus, two photodetector elements are provided in a deflection-angle detector, which are arranged as shown in FIG. 2A.

An optical deflector 100 used in the first example is configured the same as that shown in FIGS. 3A and 3B. In this example, the optical deflector 300 including the oscillators 301 and 302 and the torsion springs 311 and 312 have two vibration modes, with the frequency in one of the vibration modes being substantially double the frequency in the other mode. For example, let the moments of inertia of the oscillators 301 and 302 be denoted by $I_1$ and $I_2$, the spring constant of the set of torsion springs 311a and 311b be denoted by $k_1$, and the spring constant of the set of torsion springs 312a and 312b be denoted by $k_2$. Then, two natural vibration frequencies (natural vibration modes) are determined unambiguously. In this example, the moments of inertia $I_1$ and $I_2$ and the spring constants $k_1$ and $k_2$ are adjusted so that $\omega_1 = 2\pi \times 2000$ (rad/s) and $\omega_2 = 2\pi \times 4000$ (rad/s).

The deflection angle $\theta$ of the optical deflection apparatus can be expressed by expression (2) below, where $A_1$ and $\omega_1$ denote the amplitude and angular frequency of a first vibration movement, $A_2$ and $\omega_2$ denote the amplitude and angular frequency of a second vibration movement, $\phi$ denotes a relative phase between these two frequencies, and t denotes time:

$$\theta(t) = A_1 \sin(\omega_1 t) + A_2 \sin(\omega_2 t + \phi) \quad (2)$$

Assuming herein that $A_1=1$, $A_2=0.2$, $\phi=0$, $\omega_1=2\pi\times 2000$, and $\omega_2=2\pi\times 4000$, the deflection angle $\theta$ and angular velocity $\theta'$ of the optical deflection apparatus change in time as shown in FIGS. 4A and 4B. The deflection angle $\theta$ represented by a solid line in FIG. 4A becomes closer to a sawtooth wave than a sine wave (represented by a broken line), and the angular velocity $\theta'$ has less amount of change in the region of substantially constant angular velocity than that of a sine wave (represented by a broken line). The units of values along the vertical axes in FIGS. 4A and 4B are arbitrarily chosen.

Although $A_1=1$, $A_2=0.2$, $\phi=0$, $\omega_1=2\pi\times 2000$, and $\omega_2=2\pi\times 4000$ in this example, the values of $A_1$, $A_2$, $\phi$, $\omega_1$, and $\omega_2$ may be other values as long as the amount of change in the angular velocity $\theta'$ is less than that of a sine wave in the region of substantially constant angular velocity. It is desired that, in a continuous period having a length of 20% or longer in one cycle based on the first frequency, the maximum value and minimum value of the angular velocity $\theta'$ of the reflection mirror satisfies a relationship of (maximum value−minimum value)/(maximum value+minimum value)<0.1.

Let it be supposed that the first and second photoreceptors 141 and 142 are provided at positions corresponding to the deflection angle $\theta$ having a value of 0.8 ($A_1\times 0.8$ assuming that the maximum deflection angle is 1), symmetrically with respect to the center of scanning of the optical deflection apparatus. Among target times $t_{10}$, $t_{20}$, $t_{30}$, and $t_{40}$ at which the deflected light 133 should pass through positions of the first and second photodetector elements 141 and 142, $t_{10}$ is used as a reference time. Then, target times $(t_{20}-t_{10})$, $(t_{30}-t_{10})$, and $(t_{40}-t_{10})$ are 0.102 msec, 0.294 msec, and 0.396 msec, respectively. When the optical deflector 100 is controlled according to this timing, the deflection angle $\theta$ and angular velocity $\theta'$ of the optical deflector 100 changes in time as shown in FIGS. 4A and 4B. The deflection angle $\theta$ becomes closer to a sawtooth wave than a sine wave, and the angular velocity $\theta'$ has less amount of change in the region of substantially constant angular velocity than a sine wave.

Next, a specific method of controlling the optical deflection apparatus according to this example will be described.

Let deflection angles corresponding to the positions of the first and second photodetector elements 141 and 142 be denoted by $\theta_{BD1}$ and $\theta_{BD2}$, respectively. Then, deflection angles at certain times $t_1$ and $t_2$ satisfy expression (3) below, and deflection angles at certain times $t_3$ and $t_4$ satisfy expression (4) below:

$$\theta(t_1)=\theta(t_2)=\theta_{BD1} \quad (3)$$

$$\theta(t_3)=\theta(t_4)=\theta_{BD2} \quad (4)$$

Thus, the deflection angle $\theta$ of the optical scanner can be controlled as shown in FIGS. 4A by exercising control so that three detected times $(t_2-t_1)$, $(t_3-t_1)$, and $(t_4-t_1)$ at which the deflected light 133 passes through the positions of the first and second photodetector elements 141 and 142 have the values of the target times described above.

Now, let it be supposed that a control parameter X of the optical scanner, including $A_1$, $A_2$, or $\phi$, has slightly varied from the target value. In this case, coefficients and a matrix M representing changes in detected times $(t_2-t_1)$, $(t_3-t_1)$, and $(t_4-t_1)$ at which the scanning light 133 passes through the positions of the first and second photodetector elements 141 and 142 can be expressed by expressions (5) and (6) below:

$$\left.\frac{\partial t}{\partial X}\right|_{ti}, (X=A1, A2, \phi), (i=2,3,4) \quad (5)$$

$$M = \begin{bmatrix} \left.\frac{\partial t}{\partial A1}\right|_{t2} - \left.\frac{\partial t}{\partial A1}\right|_{t1} & \left.\frac{\partial t}{\partial A2}\right|_{t2} - \left.\frac{\partial t}{\partial A2}\right|_{t1} & \left.\frac{\partial t}{\partial \phi}\right|_{t2} - \left.\frac{\partial t}{\partial \phi}\right|_{t1} \\ \left.\frac{\partial t}{\partial A1}\right|_{t3} - \left.\frac{\partial t}{\partial A1}\right|_{t1} & \left.\frac{\partial t}{\partial A2}\right|_{t3} - \left.\frac{\partial t}{\partial A2}\right|_{t1} & \left.\frac{\partial t}{\partial \phi}\right|_{t3} - \left.\frac{\partial t}{\partial \phi}\right|_{t1} \\ \left.\frac{\partial t}{\partial A1}\right|_{t4} - \left.\frac{\partial t}{\partial A1}\right|_{t1} & \left.\frac{\partial t}{\partial A2}\right|_{t4} - \left.\frac{\partial t}{\partial A2}\right|_{t1} & \left.\frac{\partial t}{\partial \phi}\right|_{t4} - \left.\frac{\partial t}{\partial \phi}\right|_{t1} \end{bmatrix} \quad (6)$$

Thus, the amounts of operation $\Delta A_1$, $\Delta A_2$, and $\Delta\phi$ in the amplitudes and phase of the mirrors can be calculated according to expression (7) below using time differences $\Delta t_2$, $\Delta t_3$, and $\Delta t_4$ between the three detected times $(t_2-t_1)$, $(t_3-t_1)$, and $(t_4-t_1)$ and the three target times $(t_{20}-t_{10})$, $(t_{30}-t_{10})$, and $(t_{40}-t_{10})$:

$$\begin{bmatrix}\Delta A1 \\ \Delta A2 \\ \Delta\phi\end{bmatrix} = M^{-1}\begin{bmatrix}\Delta t2 \\ \Delta t3 \\ \Delta t4\end{bmatrix} \quad (7)$$

According to expression (7) above, the amounts of operation $\Delta A_1$, $\Delta A_2$, and $\Delta\phi$ are calculated using the time differences $\Delta t_2$, $\Delta t_3$, and $\Delta t_4$ from the three target times $(t_{20}-t_{10})$, $(t_{30}-t_{10})$, and $(t_{40}-t_{10})$. The deflection angle $\theta$ can be adjusted to a desired value by changing the driving signal according to these values.

Figure 5:
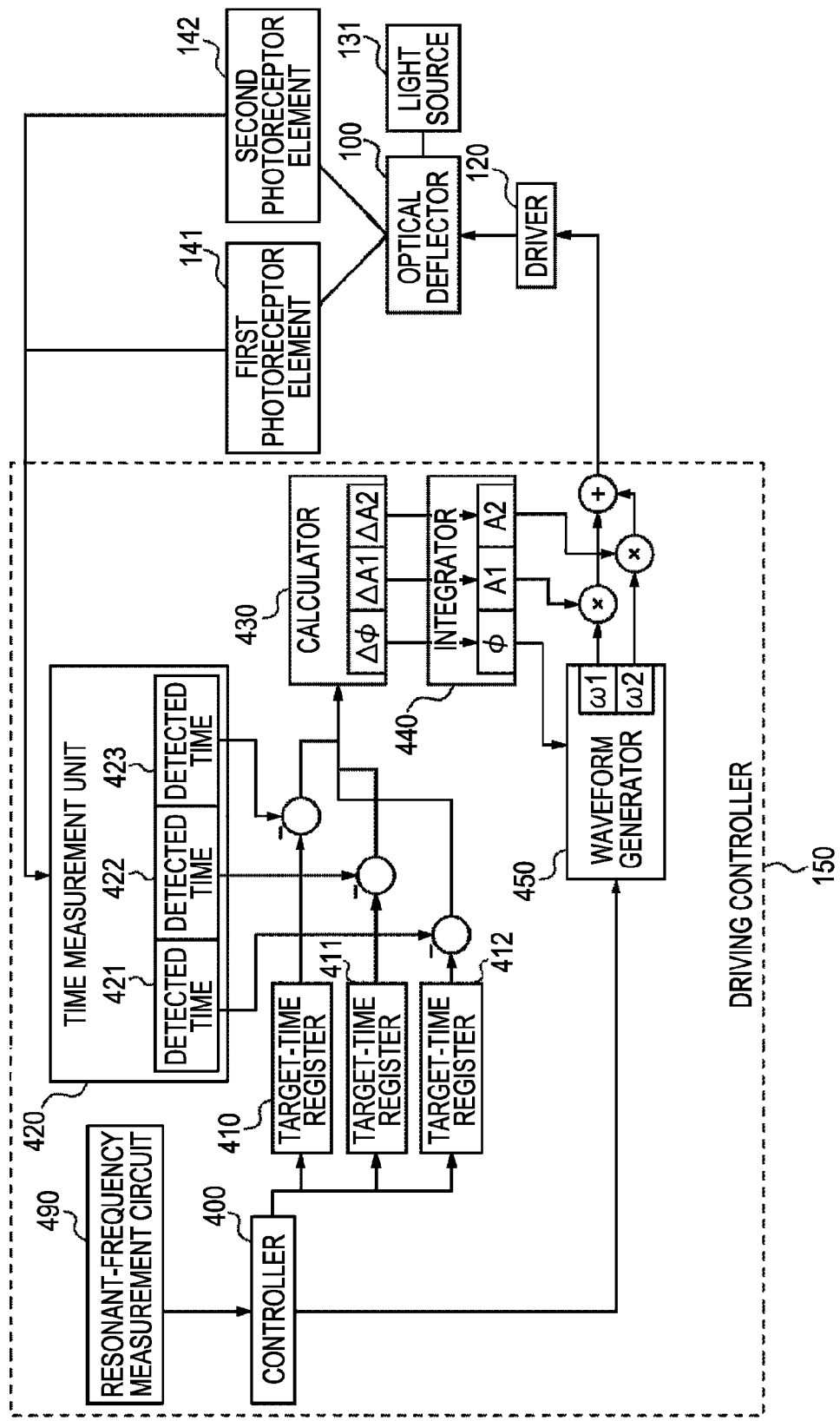
FIG. 5 is a block diagram relating to control of the optical deflection apparatus according to the present invention.

FIG. 5 is a block diagram showing the driving controller 150 of the optical scanner in detail.

Referring to FIG. 5, the controller 400 sets a reference frequency for driving of the optical deflector 100, on the basis of the value of resonant frequency obtained by the resonant-frequency measurement circuit 490.

Information representing the reference frequency set by the controller 400 is output to a waveform generator 450, and the waveform generator 450 sets reference frequencies $\omega_1$ and $\omega_2$.

The waveform generator 450 outputs sine waves having the frequencies $\omega_1$ and $\omega_2$. In a case where the vibration system described earlier is controlled, the frequencies $\omega_1$ and $\omega_2$ are set to have initial values of substantially 2000 Hz and 4000 Hz.

The amplitudes $A_1$ and $A_2$ and the relative phase difference $\phi$ are calculated by a calculator 430 and are output through an integrator 440.

The two generated sine waves are multiplied individually with the amplitudes $A_1$ and $A_2$ by a multiplier, and the sum of the results of multiplication is input to the driver 120, whereby a current is caused to flow through the coil 342.

The outputs of the first and second photodetector elements 141 and 142 are input to the time measurement unit 420 and stored therein as detected times $(t_2-t_1)$, $(t_3-t_1)$, and $(t_4-t_1)$ (421, 422, and 423).

Furthermore, the controller 400 sets target times $(t_{20}-t_{10})$, $(t_{30}-t_{10})$, and $(t_{40}-t_{10})$ based on the reference frequencies, in the target-time registers 410, 411, and 412. In this case, the reference frequencies are 2000 Hz and 4000 Hz, and the target times $(t_{20}-t_{10})$, $(t_{30}-t_{10})$, and $(t_{40}-t_{10})$ are 0.102 msec, 0.294 msec, and 0.396 msec.

Then, subtraction is performed to calculate time differences $\Delta t_2$, $\Delta t_3$, and $\Delta t_4$ between the times detected by the time measurement unit 420 and the target times set by the controller 400, and the results are input to the calculator 430.

Then, the calculator 430 performs calculation according to the matrix M on the basis of the values of the time differences $\Delta t_2$, $\Delta t_3$, and $\Delta t_4$ to obtain the amounts of operation $\Delta A_1$, $\Delta A_2$, and $\Delta \phi$.

The integrator 440 integrates the amounts of operation $\Delta A_1$, $\Delta A_2$, and $\Delta \phi$ individually, and outputs the results $A_1$, $A_2$, and $\phi$. The integrator 440 has integration characteristics in a region of low frequencies while having flat frequency characteristics in a region of high frequencies.

$A_1$ and $A_2$ are multiplied by the multiplier individually with the two outputs of the waveform generator 450 to control the amplitudes of sine waves, and $\phi$ is input to the waveform generator 450 to modify the phase of the two sine waves.

By repeating this operation, control is exercised so that $(t_2-t_1)$, $(t_3-t_1)$, and $(t_4-t_1)$ become equal to the target times $(t_{20}-t_{10})$, $(t_{30}-t_{10})$, and $(t_{40}-t_{10})$, whereby the deflection angle $\theta$ is adjusted to a desired angle.

Next, an operation in a case where the resonant frequency has changed will be described.

While exercising control as described above, the controller 400 periodically checks the output of the resonant-frequency measurement circuit 490.

The resonant-frequency measurement circuit 490 can measure the resonant frequency of the optical deflector 100 in the following manner. While the optical deflector 100 is being driven, exercise is controlled so that the output of the driver 120 becomes zero, whereby the optical deflector 100 is deactivated. Then, the frequency of vibration in this state is detected using a counter electromotive force. This allows measurement of the resonant frequency of the vibration system.

Upon detecting a change in the resonant frequency, the controller 400 sets a frequency that is the same as the detected frequency to the waveform generator 450. For example, if the lower resonant frequency ($\omega_1$) has changed from 2000 Hz to 2010 Hz, the controller 400 sets 2010 Hz and 4020 Hz to the waveform generator 450.

At the same time, the controller 400 changes the target times $(t_{20}-t_{10})$, $(t_{30}-t_{10})$, and $(t_{40}-t_{10})$ set in the target-time registers so that the deflection angle $\theta$ with the changed frequencies becomes 0.8. The values of the target times may be calculated by the controller 400 on the basis of the frequencies set to the waveform generator 450, or using a frequency vs. target time table. In the case where the values are calculated, the values can be calculated, for example, by multiplying target times for a predetermined frequency with a reciprocal of a ratio between the target times and designed frequencies at the predetermined frequency.

More specifically, the controller 400 sets new target times as described below to replace 0.102 msec, 0.294 msec, and 0.396 msec as the target times $(t_{20}-t_{10})$, $(t_{30}-t_{10})$, and $(t_{40}-t_{10})$ for the reference frequency of 2000 Hz.

The ratio between the previous reference frequency (2000 Hz) and the newly set reference frequency (2010 Hz) is 1.005 (i.e., 2010 Hz is 1.005 times 2000 Hz).

Thus, 0.102 msec, 0.294 msec, and 0.396 msec for the previous reference frequency are divided by the ratio between the previous reference frequency and the newly set reference frequency.

Then, the target times for the newly set reference frequency become 0.1015 msec, 0.2925 msec, and 0.394 msec, and these values are set as the target times $(t_{20}-t_{10})$, $(t_{30}-t_{10})$, and $(t_{40}-t_{10})$. In this case, it suffices for the controller 400 to store only the values of target times for a predetermined frequency.

Alternatively, the controller 400 may have a driving frequency vs. target time table. In this case, the controller 400 refers to the table on the basis of a driving frequency that is set, and sets corresponding values in the table as the target times $(t_{20}-t_{10})$, $(t_{30}-t_{10})$, and $(t_{40}-t_{10})$.

In this case, values of target times are stored in the table, for example, 0.102 msec, 0.294 msec, and 0.396 msec for 2000 Hz, and 0.1015 msec, 0.2925 msec, and 0.394 msec for 2010 Hz.

In this method, the table suffices to include target values in a range of frequencies that can be set. In this case, complex calculation involving decimal places, which is needed in the method described earlier, is not needed. Thus, this method can be implemented using an inexpensive controller.

By repeating this operation, even when the resonant frequency changes, control is exercised so that $(t_2-t_1)$, $(t_3-t_1)$, and $(t_4-t_1)$ become equal to $(t_{20}-t_{10})$, $(t_{30}-t_{10})$, and $(t_{40}-t_{10})$, whereby the deflection angle $\theta$ is adjusted to a desired angle.

Although $(t_{20}-t_{10})$, $(t_{30}-t_{10})$, and $(t_{40}-t_{10})$ are specific values in this example, $(t_{20}-t_{10})$, $(t_{30}-t_{10})$, and $(t_{40}-t_{10})$ may be defined as ranges with certain tolerances.

Furthermore, although the first and second photodetector elements 141 and 142 are provided at positions corresponding to deflection angles $\theta$ of 0.8 and symmetrically with respect to the center of scanning of the optical deflection apparatus in this example, each of the first and second photodetector elements 141 and 142 may be provided at a position corresponding to an arbitrary deflection angle $\theta$. For example, each of the first and second photodetector elements 141 and 142 may be provided at a position corresponding to a deflection angle $\theta$ having an absolute value greater than or equal to 0.6 and less than 1.0. The range where the absolute value of the deflection angle $\theta$ is greater than or equal to 0.6 and less than 1.0 includes a range where the deflection angle $\theta$ is greater than or equal to +0.6 and less than +1.0 and a range where the deflection angle $\theta$ is greater than −1.0 and less than or equal to −0.6. The maximum deflection angle is defined to be ±1 with respect to zero corresponding to the center of deflection of the reflection mirror.

This example deals with a vibrator having two vibration modes. However, the present invention is applicable to a vibrator having a single vibration mode. In this case, a feedback control system that drives the optical deflector at a frequency of $\omega_1$ and changes only $A_1$ is provided. This feedback control system can exercise control by calculating the difference between a detected time $(t_3-t_2)$ and a target time $(t_{30}-t_{20})$ and generating $A_1$ by amplifying the difference by an integrator or the like. Also in this case, the resonant frequency of the vibrator in the single vibration mode is measured, and the driving frequency and target time are changed on the basis of the measured frequency.

Although the resonant frequency and the driving frequency are equal in the example described above, these frequencies may be frequencies somewhat different from each other instead of being exactly the same frequency. Also in this case, target times are set according to the driving frequency that is set.

Second Example

A second example of an optical deflection apparatus according to the present invention will be described. The optical deflection apparatus of the second example is basically the same as that of the first example. However, as opposed to the first example, in the second example, driving is controlled on the basis of four values of time.

Let the amplitude, angular frequency, and phase of a first vibrating movement be denoted by $A_1$, $\omega_1$, and $\phi_1$, respectively, and the amplitude, angular frequency, and phase of a second vibrating movement be denoted by $A_2$, $\omega_2$, and $\phi_2$, respectively, and let the time with reference to a certain time as an origin or reference time be denoted by t. Then, the deflection angle of one of the oscillators can be expressed by expression (8) below:

$$\theta(t) = A_1 \sin(\omega_1 t + \phi_1) + A_2 \sin(\omega_2 t + \phi_2) \quad (8)$$

Expression (8) represents a vibration similar to that represented by expression (2). More specifically, in expression (2), $\phi_1$ and $\phi_2$ are replaced by the relative phase difference $\phi$.

Let the deflection angles corresponding to the positions of the photoreceptors 141 and 142 be denoted by $\theta_{BD1}$ and $\theta_{BD2}$, respectively. Then, $\theta(t_1) = \theta(t_2) = \theta_{BD1}$ (3) is satisfied at certain times $t_1$ and $t_2$, and $\theta(t_3) = \theta(t_4) = \theta_{BD2}$ (4) is satisfied at certain times $t_3$ and $t_4$.

In this example, a driving method based on the four times ($t_1$, $t_2$, $t_3$, $t_4$) will be described.

Also in this example, vibration of the optical deflector can be expressed by expression (1). Furthermore, also in this example, it is assumed that $A_1=1$, $A_2=0.2$, $\phi_1=0$, $\phi_2=0(\phi=0)$, $\omega_1=2\pi\times2000$, and $\omega_2=2\pi\times4000$. The deflection angle $\theta$ and angular velocity $\theta'$ of the optical deflection apparatus change in time as shown in FIGS. 4A and 4B.

Let it be supposed that the first and second photodetector elements 141 and 142 are provided at different positions with the deflection angle $\theta$ corresponding to 80% of $A_1$, i.e., the deflection angle $\theta$ being 0.8. With reference to a time of zero at which the deflection angle $\theta$ is zero (center of scanning), target times $t_{10}$, $t_{20}$, $t_{30}$, and $t_{40}$ are 0.052 msec, 0.154 msec, 0.346 msec, and 0.048 msec, respectively. When the optical deflector is driven according to this timing, the deflection angle $\theta$ and angular velocity $\theta'$ of the optical deflector change in time as shown in FIGS. 4A and 4B. The deflection angle $\theta$ becomes closer to a sawtooth wave than a sine wave, and the angular velocity $\theta'$ has less amount of change in the region of substantially constant angular velocity than a sine wave.

Now, let it be supposed that a control parameter X of the optical scanner, including $A_1$, $A_2$, $\phi_1$, or $\phi_2$ has slightly varied from the target value. In this case, coefficients and a matrix M representing changes in detected times $t_1$, $t_2$, $t_3$, and $t_4$ at which the deflected light 133 passes through the positions of the first and second photodetector elements 141 and 142 can be expressed by expressions (9) and (10) below:

$$\left.\frac{\partial t}{\partial X}\right|_{ti} (X = A1, \phi1, A2, \phi2), (i = 2,3,4) \quad (9)$$

$$M = \begin{bmatrix} \left.\frac{\partial t}{\partial A1}\right|_{t1} & \left.\frac{\partial t}{\partial A2}\right|_{t1} & \left.\frac{\partial t}{\partial \phi1}\right|_{t1} & \left.\frac{\partial t}{\partial \phi2}\right|_{t1} \\ \left.\frac{\partial t}{\partial A1}\right|_{t2} & \left.\frac{\partial t}{\partial A2}\right|_{t2} & \left.\frac{\partial t}{\partial \phi1}\right|_{t2} & \left.\frac{\partial t}{\partial \phi2}\right|_{t2} \\ \left.\frac{\partial t}{\partial A1}\right|_{t3} & \left.\frac{\partial t}{\partial A2}\right|_{t3} & \left.\frac{\partial t}{\partial \phi1}\right|_{t3} & \left.\frac{\partial t}{\partial \phi2}\right|_{t3} \\ \left.\frac{\partial t}{\partial A1}\right|_{t4} & \left.\frac{\partial t}{\partial A2}\right|_{t4} & \left.\frac{\partial t}{\partial \phi1}\right|_{t4} & \left.\frac{\partial t}{\partial \phi2}\right|_{t4} \end{bmatrix} \quad (10)$$

Thus, the amounts of operation $\Delta A_1$, $\Delta\phi_1$, $\Delta A_2$, and $\Delta\phi_2$ in the amplitudes and phases of the mirrors can be calculated according to expression (11) below using time differences $\Delta t_1$, $\Delta t_2$, $\Delta t_3$, and $\Delta t_4$ between the four detected times $t_1$, $t_2$, $t_3$, and $t_4$ and the four target times $t_{10}$, $t_{20}$, $t_{30}$, and $t_{40}$:

$$\begin{bmatrix} \Delta A1 \\ \Delta A2 \\ \Delta\phi1 \\ \Delta\phi2 \end{bmatrix} = M^{-1} \begin{bmatrix} \Delta t1 \\ \Delta t2 \\ \Delta t3 \\ \Delta t4 \end{bmatrix} \quad (11)$$

According to expression (11) above, the amounts of operation $\Delta A_1$, $\Delta A_2$, $\Delta\phi_1$, and $\Delta\phi_2$ are calculated using the time differences $\Delta t_1$, $\Delta t_2$, $\Delta t_3$, and $\Delta t_4$ from the target times $t_{10}$, $t_{20}$, $t_{30}$, and $t_{40}$. The deflection angle $\theta$ can be adjusted to a desired value by changing the driving signal according to these values.

FIG. 5 is a block diagram showing the driving controller 150 of the optical scanner in detail. The following description given with reference to FIG. 5 is substantially the same as that in the case of the first example. However, the time measurement unit 420 differs in that it deals with four values of time ($t_1$, $t_2$, $t_3$, $t_4$), and the controller 400 differs in that it deals with four values of target time ($t_{10}$, $t_{20}$, $t_{30}$, $t_{40}$).

Then, subtraction is performed to calculate time differences $\Delta t_1$, $\Delta t_2$, $\Delta t_3$, and $\Delta t_4$ between the times detected by the time measurement unit 420 and the target times set by the controller 400, and the results are input to the calculator 430.

Then, the calculator 430 performs calculation according to the matrix M on the basis of the values of the time differences $\Delta t_1$, $\Delta t_2$, $\Delta t_3$, and $\Delta t_4$ to obtain the amounts of operation $\Delta A_1$, $\Delta A_2$, and $\Delta\phi_1$, and $\Delta\phi_2$.

The integrator 440 integrates the amounts of operation $\Delta A_1$, $\Delta A_2$, and $\Delta\phi_1$, and $\Delta\phi_2$ individually, and outputs the results $A_1$, $A_2$, and $\phi_1$, and $\phi_2$. The integrator 440 has integration characteristics in a region of low frequencies while having flat frequency characteristics in a region of high frequencies.

$A_1$ and $A_2$ are multiplied by the multiplier individually with the two outputs of the waveform generator 450 to control the amplitudes of sine waves, and $\phi_1$ and $\phi_2$ are input to the waveform generator 450 to modify the phases of the two sine waves.

By repeating this operation, control is exercised so that $t_1$, $t_2$, $t_3$, and $t_4$ become equal to the target times $t_{10}$, $t_{20}$, $t_{30}$, and $t_{40}$, whereby the deflection angle $\theta$ is adjusted to a desired angle.

Next, an operation in a case where the resonant frequency has changed will be described.

While exercising control as described above, the controller 400 periodically checks the output of the resonant-frequency measurement circuit 490. The method of measurement of the resonant frequency is the same as that in the case of the first example.

Upon detecting a change in the resonant frequency, the controller 400 sets a frequency that is the same as the detected frequency to the waveform generator 450. For example, if the lower resonant frequency ($\omega_1$) has changed from 2000 Hz to 2010 Hz, the controller 400 sets 2010 Hz and 4020 Hz to the waveform generator 450.

At the same time, the controller 400 changes the target times $t_{10}$, $t_{20}$, $t_{30}$, and $t_{40}$ set in the target-time registers so that the deflection angle $\theta$ with the changed frequencies becomes 0.8. The values of the target times may be calculated by the controller 400 on the basis of the frequencies set to the waveform generator 450, or using a frequency vs. target time table.

By repeating this operation, even when the resonant frequency changes, control is exercised so that $t_1$, $t_2$, $t_3$, and $t_4$ become equal to the target times $t_{10}$, $t_{20}$, $t_{30}$, and $t_{40}$, whereby the deflection angle θ is adjusted to a desired angle.

Third Example

Figure 6:
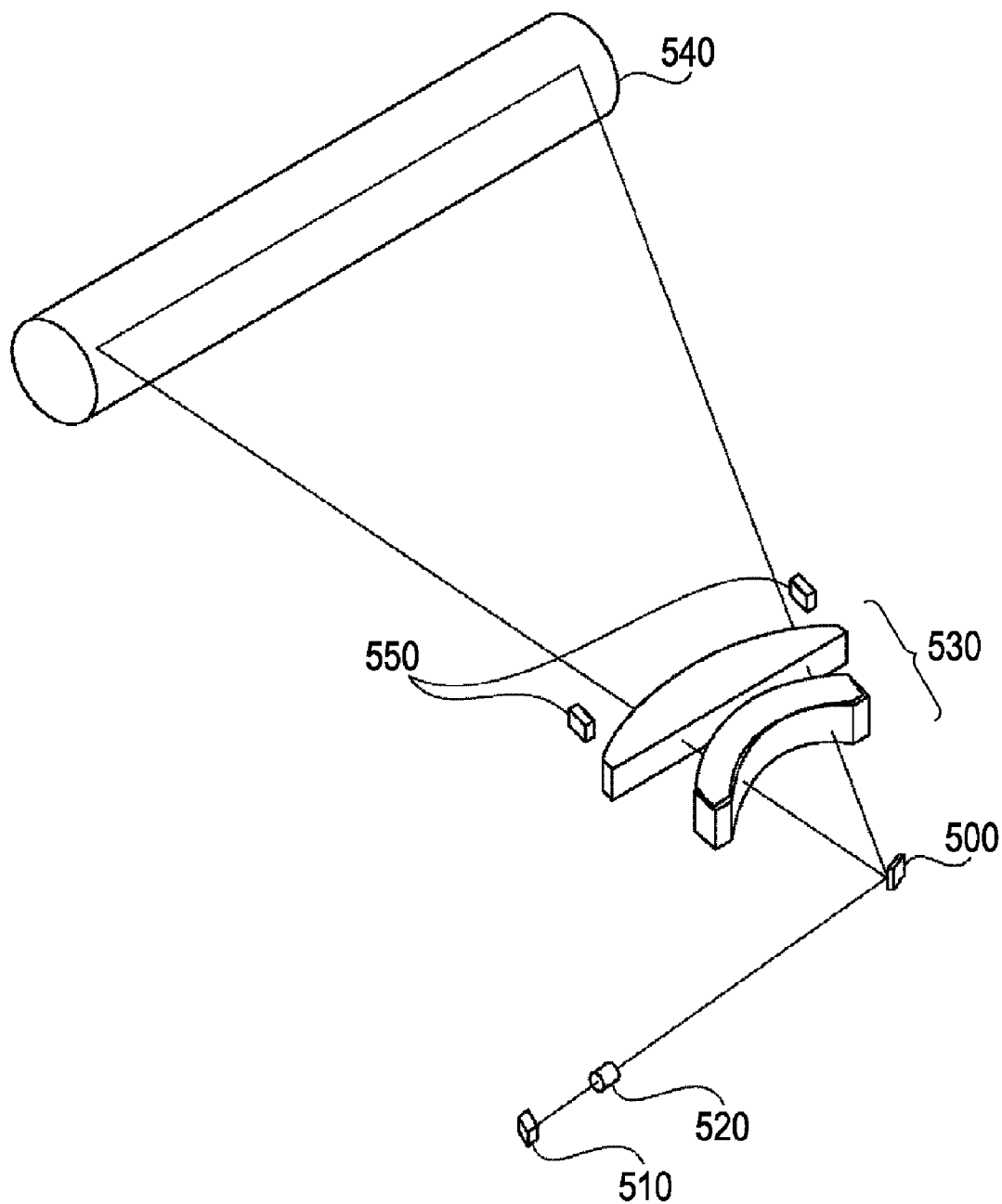
FIG. 6 is an illustration of an image forming apparatus according to the present invention.
Figure 7:
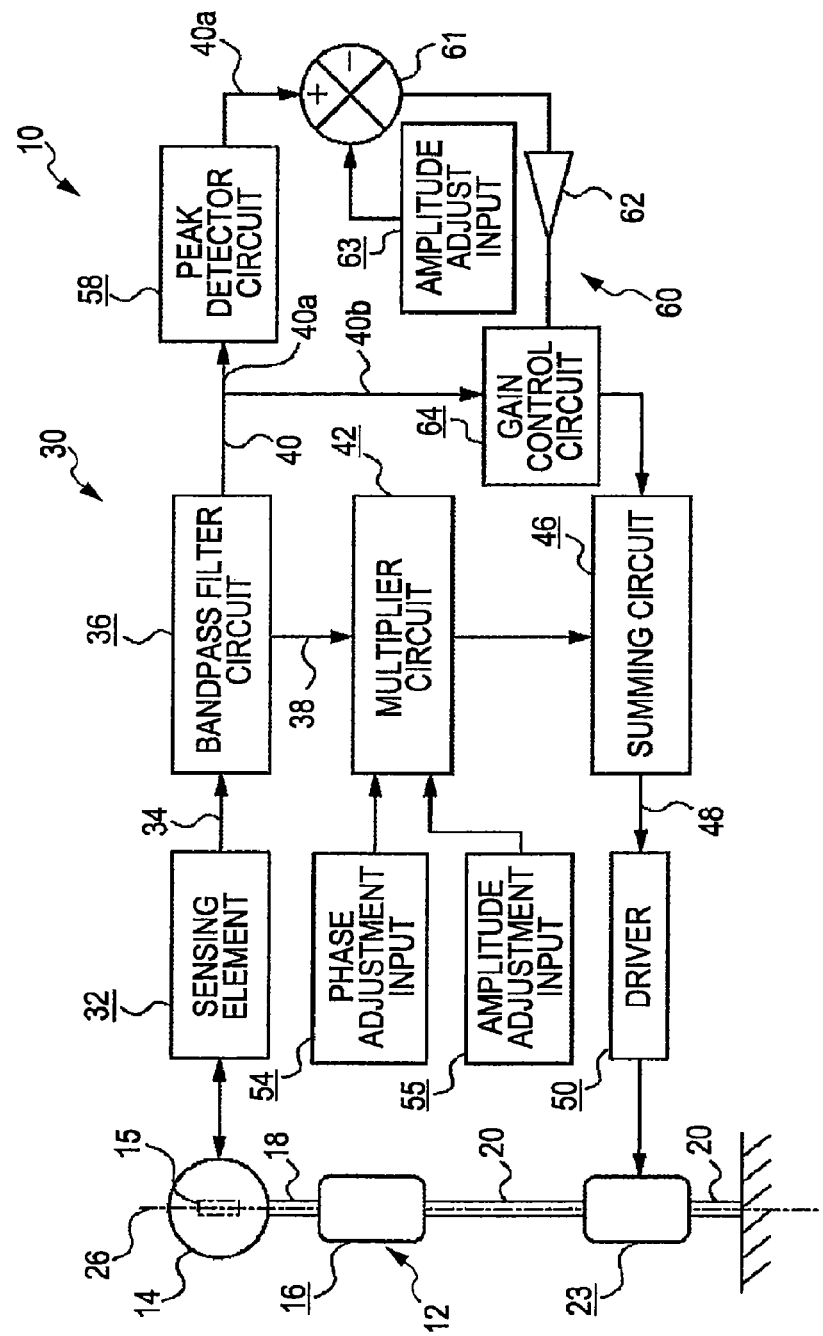
FIG. 7 is a diagram showing an optical deflector according to the related art.

FIG. 6 is a schematic perspective view of an image forming apparatus including an optical deflection apparatus according to the present invention. Referring to FIG. 6, an optical deflector according to the present invention performs one-dimensional scanning with incident light. The image forming apparatus includes a laser light source 510, a collimator lens 520, coupled lenses 530, and a photosensitive drum 540. The collimator lens 520 and the coupled lenses 530 form an optical system.

Laser light emitted from the laser light source 510 undergoes predetermined intensity modulation related to timing of deflection scanning with light. The intensity-modulated light passes through the collimator lens 520, and the optical scanning system (optical deflector) 500 performs one-dimensional scanning with the passing light. The laser light used for scanning is condensed at a target position on the photosensitive drum 540 through the coupled lenses 530 to form an image.

The photosensitive drum 540 is rotated about a rotation axis, in a direction perpendicular to the direction of scanning and is charged uniformly by a charging unit (not shown). By scanning the surface of the photosensitive drum 540, an electrostatic latent image is formed in the scanned region. Then, a toner image is formed at an image portion of the electrostatic latent image by a developing unit (not shown). The toner image is transferred to and fixed on a sheet or the like (not shown), whereby an image is formed on the sheet.

In the image forming apparatus according to the present invention, photodetector elements 550 are provided at positions corresponding to deflection angles of the optical deflector 500 in regions not corresponding to an effective region of the photosensitive drum 540, and the driving method described earlier is used so that the angular velocity of the deflection angle of the optical scanner becomes substantially constant on the photosensitive drum 540. Using the image forming apparatus including the optical deflector according to the present invention, printing can be performed favorably.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-096323 filed Apr. 2, 2007, which is hereby incorporated by reference herein in its entirety.

What is claimed is:

1. An optical deflection apparatus comprising:
a light source configured to generate a light beam;
an optical deflector including a first oscillator, a second oscillator, a first torsion spring, and a second torsion spring, the first torsion spring connecting the first oscillator and the second oscillator, the second torsion spring being connected to the second oscillator, and the first and second torsion springs sharing a common torsion axis;
a driver configured to apply a driving force to the optical deflector; and
a driving controller configured to supply a driving signal to the driver;
wherein the driving controller is configured (1) to set a reference frequency of the driving signal for driving the optical deflector on the basis of a resonant frequency of the optical deflector, (2) to calculate a target time at which one of the first and second oscillators makes a predetermined deflection angle on the basis of the reference frequency, and (3) to supply such a driving signal that at least one of the first and second oscillators passes through a point corresponding to the predetermined deflection angle at the target time.

2. The optical deflection apparatus according to claim 1, wherein a displacement of one of the first and second oscillators is expressed by a mathematical expression at least including a term expressed as $A_1 \sin \omega t + A_2 \sin(n\omega t + \phi f)$, where $A_1$ and $A_2$ denote amplitudes, φ denotes a relative phase difference, ω denotes an angular frequency, t denotes time, and n is an integer greater than or equal to two.

3. The optical deflection apparatus according to claim 1, further comprising a deflection-angle detector configured to detect deflection angles of the at least one of the first and second oscillators, wherein the driving controller determines the driving signal according to the target time calculated on the basis of the reference frequency and according to time information, detected by the deflection-angle detector, representing a time at which the at least one of the oscillators makes the predetermined deflection angle.

4. The optical deflection apparatus according to claim 2, wherein, according to the target time calculated on the basis of the reference frequency and according to time information representing a time at which the at least one of the oscillators makes the predetermined deflection angle, the driving controller supplies such a driving signal that $A_1$, $A_2$, and φ in the mathematical expression at least including the term $A_1 \sin \omega t + A_2 \sin(n\omega t + \phi)$, representing the displacement of the at least one of the oscillators, have predetermined values.

5. The optical deflection apparatus according to claim 3,
wherein the at least one of the oscillators makes first and second deflection angles,
wherein the deflection-angle detector detects first and second times at which the at least one of the oscillators makes the first deflection angle, the first and second times being different from each other, and detects third and fourth times at which the at least one of the oscillators makes the second deflection angle, the third and fourth times being different from each other, and
wherein the driving controller sets a reference frequency of the driving signal for driving the optical deflector on the basis of the resonant frequency of the optical deflector, calculates target times for $\Delta t_2$, $\Delta t_3$, and $\Delta t_4$ on the basis of the reference frequency, and supplies such a driving signal to the driver that the at least one of the oscillators is driven according to the target times, where $\Delta t_2$ denotes a difference between the second time and the first time, $\Delta t_3$ denotes a difference between the third time and the first time, and $\Delta t_4$ denotes a difference between the fourth time and the first time.

6. The optical deflection apparatus according to claim 1,
wherein the at least one of the oscillators makes first and second deflection angles,
wherein the deflection-angle detector detects first and second times at which the at least one of the oscillators makes the first deflection angle, the first and second times being different from each other, detects third and fourth times at which the at least one of the oscillators makes the second deflection angle, the third and fourth times being different from each other, and
wherein the driving controller sets a reference frequency of the driving signal for driving the optical deflector on the basis of the resonant frequency of the optical deflector, calculates target times for the first to fourth times on the basis of the reference frequency, and supplies such a driving signal to the driver that the at least one of the oscillators is driven according to the target times.

7. An image forming apparatus comprising:
an optical deflection apparatus according to claim 1;
an optical system; and
a photosensitive body;
wherein the optical deflector performs scanning using the light beam generated by the light source, and the optical system condenses scanning line at a target position on the photosensitive body.

8. A method of driving an optical deflection apparatus including an optical deflector having a plurality of natural vibration modes, the method comprising the steps of:
measuring a resonant frequency of the optical deflector;
setting a reference frequency for driving the optical deflector, on the basis of the resonant frequency that has been measured;
setting a target time at which deflected light deflected by the optical deflector makes a predetermined deflection angle, on the basis of the reference frequency that has been set;
measuring a time at which the optical deflector makes the predetermined angle; and
determining a driving signal for driving the optical deflector on the basis of the target time that has been set and time information representing the time that has been measured.

9. The method according to claim 8, wherein a displacement of the deflected light is expressed by a mathematical expression at least including a term expressed as $A_1 \sin \omega t + A_2 \sin(n\omega t + \phi)$, where $A_1$ and $A_2$ denote amplitudes, f denotes a relative phase difference, $\phi$ denotes an angular frequency, $\omega$ denotes time, and n is an integer greater than or equal to two.

10. The method according to claim 9, wherein the driving signal for driving the optical deflector is such a driving signal that $A_1$, $A_2$, and $\phi$ in the mathematical expression at least including the term $A_1 \sin \omega t + A_2 \sin(n\omega t + \phi)$, representing the displacement of the deflected light, have predetermined values.

11. The method according to claim 8,
wherein the deflected light makes first and second deflection angles, and
wherein target times for $\Delta t_2$, $\Delta t_3$, and $\Delta t_4$ are set, where $\Delta t_2$ denotes a difference between a second time and a first time, $\Delta t_3$ denotes a difference between a third time and the first time, and $\Delta t_4$ denotes a difference between a fourth time and the first time, the first and second times being mutually different times at which the deflected light makes the first deflection angle, and the third and fourth times being mutually different times at which the deflected light makes the second deflection angle.

12. The method according to claim 8,
wherein the deflected light makes first and second deflection angles, and
Wherein target times for first to fourth times are set, the first and second times being mutually different times at which the deflected light makes the first deflection angle, and the third and fourth times being mutually different times at which the deflected light makes the second deflection angle.

* * * * *